Figure 1:
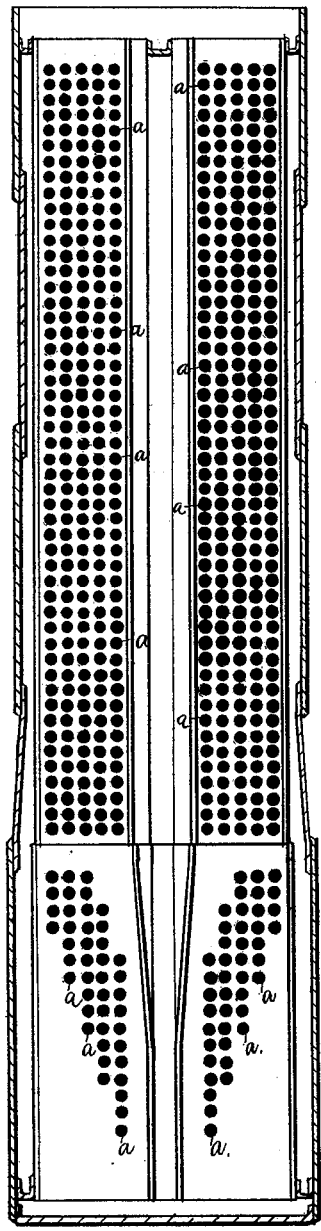
Figure 2:
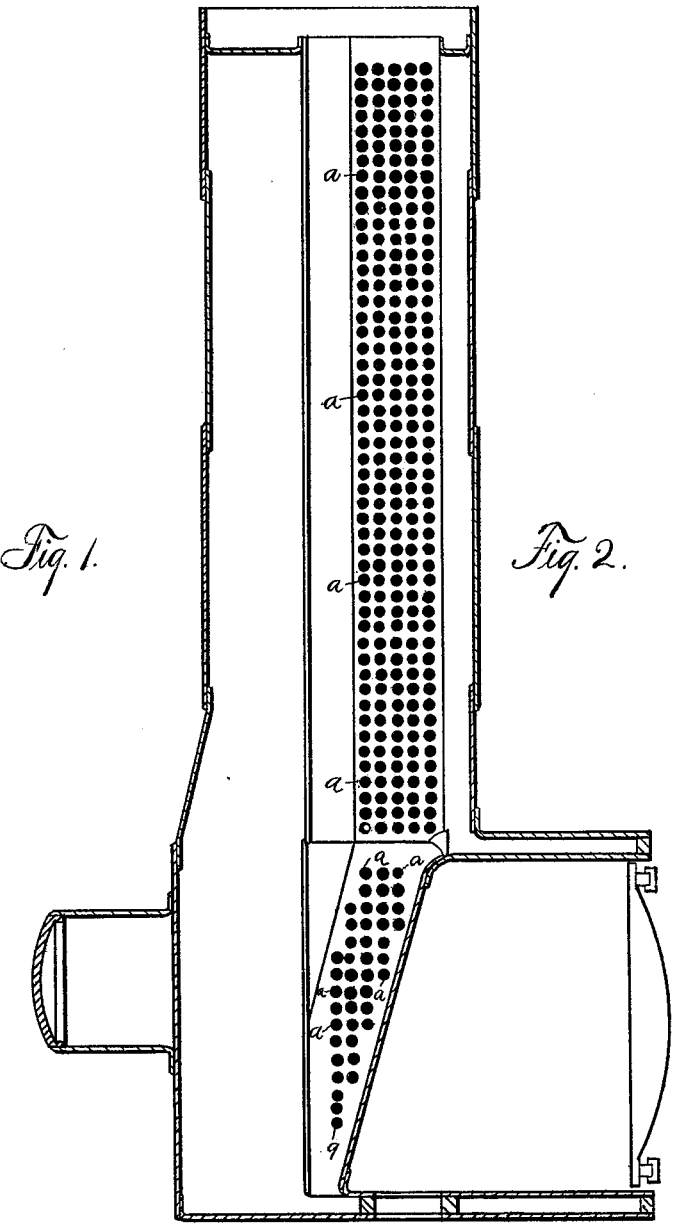
Figure 3:
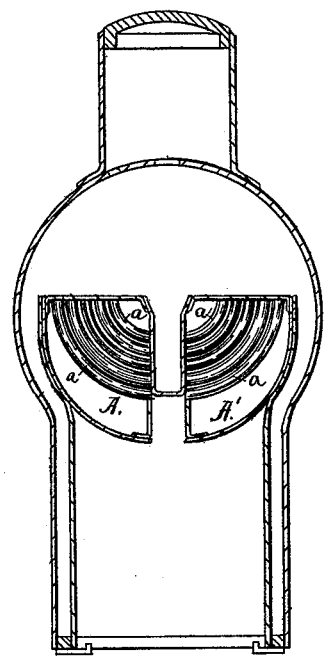
Figure 4:
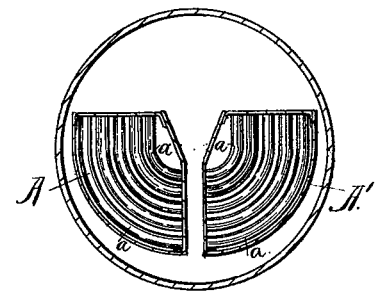

3 Sheets—Sheet 1.

D. RENSHAW & G. B. N. TOWER.
Steam-Generators.

No. 198,213. Patented Dec. 18, 1877.

Witnesses:
Wm Qittel.
Thos. F. Currier.

Inventors:
D. Renshaw and G. B. N. Tower,
by Chas. F. Sleeper
their attorney

N. PETERS, PHOTO-LITHOGRAPHER, WASHINGTON, D.C.

3 Sheets—Sheet 2.

D. RENSHAW & G. B. N. TOWER.
Steam-Generators.

No. 198,213. Patented Dec. 18, 1877.

Witnesses.
Wm Dittel.
Thos. F. Bussier

Inventors
D. Renshaw and G. B. N. Tower,
by Chas. F. Sleeper,
their atty.

D. RENSHAW & G. B. N. TOWER.
Steam-Generators.

No. 198,213.  Patented Dec. 18, 1877

Witnesses:
Wm. Gittel.
Thos. F. Currier

Inventors:
D. Renshaw and G. B. N. Tower,
by Chas. F. Sleeper,
their attorney.

UNITED STATES PATENT OFFICE.

DAVID RENSHAW, OF COHASSET, AND GEORGE B. N. TOWER, OF CAMBRIDGE, MASSACHUSETTS.

IMPROVEMENT IN STEAM-GENERATORS.

Specification forming part of Letters Patent No. 198,213, dated December 18, 1877; application filed May 3, 1877.

*To all whom it may concern:*

Be it known that we, DAVID RENSHAW, of the town of Cohasset, in the county of Norfolk and State of Massachusetts, and GEORGE B. N. TOWER, of the city of Cambridge, in the county of Middlesex, in said State, have jointly invented new and useful Improvements in Steam-Generators, which improvements are fully set forth in the following specification and accompanying drawings.

The main principle of our invention consists in adding to an ordinary flue-boiler a system of tubes within the flue, bent so as to allow them to expand and contract without injury to the joints connecting them with the walls of the flue, and so arranged that the water will circulate through the tubes from the sides of the flue to its crown. They are also so arranged that they will retard the heat passing through the flues, and the impact of the heated gases with the tubes will cause the heat to be imparted rapidly to the water.

The circulation of the water from the sides of the flues, through the bent tubes in the flues, to the body of water over the crown of the flues, must necessarily be such as to constantly produce a new body of water to be acted upon by the fire and rapidly converted into steam.

In the drawings we have shown two styles of boilers to which our invention is applied.

Figure 5:
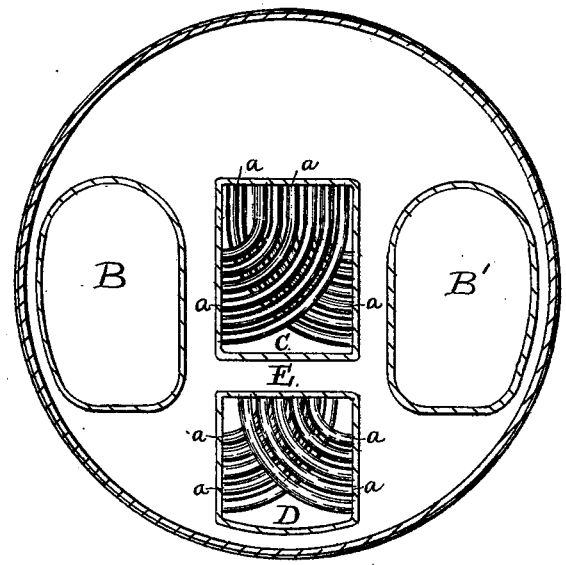
Figure 6:
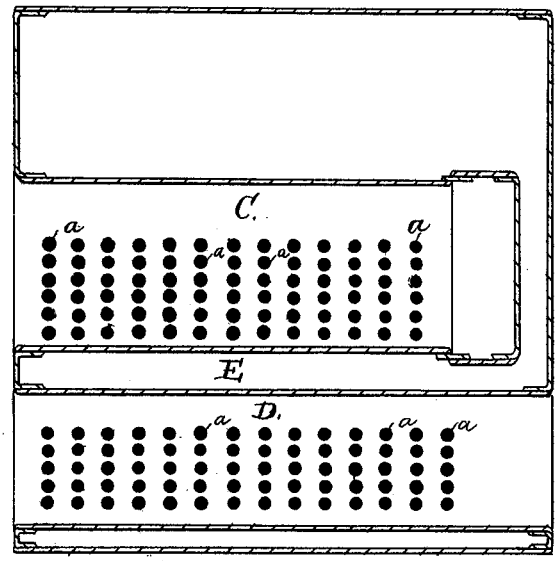

Figures 1, 2, 3, and 4 show a locomotive-boiler, and Figs. 5 and 6 a marine boiler.

In the locomotive-boiler we have arranged two flues, A and A', passing from the fire-box to the smoke-stack, their sides and tops being surrounded by water. The outer sides of these flues are curved to conform to the shape of the boiler. The inner sides are vertical, and the tops partially horizontal, as shown. $a\ a$ are tubes passing from the inner sides of the flues to the crown of the flues, to admit of the circulation above described.

In the marine boiler we have shown two fire-boxes, B B', which extend from the front to nearly the rear of the boiler, these fire-boxes being surrounded by water. The gases from these fire-boxes meet at the rear of the boiler, and pass through a flue, C, filled with tubes $a$, as in the locomotive-boiler. This flue C passes to nearly the front of the boiler. The gases then descend, and pass through a flue, D, also filled with tubes, as in the flue C, the flues C and D having interposed between them a body of water, E, into which the water passing through the tubes $a$ in the flue D emerges. The gases then pass to the rear of the boiler and escape to the smoke-stack.

From this construction it will be readily perceived that we can present a large amount of steam-generating surface to the action of the fire, and that we can retain the heat from the fuel, so that it will operate to its best advantage.

Having thus described our invention, what we claim as new, and desire to secure by Letters Patent, is—

In combination with a steam-boiler having flues passing horizontally through it from end to end, said flues being surrounded by a water-body, the bent water-tubes $a\ a$ extending from the side to the crown of the flue, as and for the purpose specified.

DAVID RENSHAW.
GEO. B. N. TOWER.

Witnesses:
CHAS. F. SLEEPER,
WM. ZITTEL.